(12) United States Patent
Mercer et al.

(10) Patent No.: US 11,038,420 B2
(45) Date of Patent: Jun. 15, 2021

(54) CHARGE PUMP TRANSIENT RESPONSE OPTIMIZATION BY CONTROLLED FLYING CAPACITOR DISCHARGE DURING BYPASS TO SWITCHING MODE TRANSITION

(71) Applicant: Dialog Semiconductor (UK) Limited, London (GB)

(72) Inventors: Mark Mercer, Phoenix, AZ (US); Jeffrey Kanner, Phoenix, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 5 days.

(21) Appl. No.: 16/528,906

(22) Filed: Aug. 1, 2019

(65) Prior Publication Data

US 2021/0034085 A1    Feb. 4, 2021

(51) Int. Cl.
*H02M 3/158*    (2006.01)
*H02M 3/07*    (2006.01)
*H02M 1/00*    (2006.01)

(52) U.S. Cl.
CPC ............ *H02M 3/158* (2013.01); *H02M 3/07* (2013.01); *H02M 3/073* (2013.01); *H02M 2001/0003* (2013.01); *H02M 2001/0067* (2013.01)

(58) Field of Classification Search
CPC ............ H02M 1/08; H02M 1/32; H02M 1/36; H02M 3/07; H02M 3/073; H02M 3/156; H02M 3/158; H02M 3/1584; H02M 2001/0025; H02M 2001/0045; H02M 2001/0067; H02M 2001/007; H02M 2003/07; H02M 2003/073; H02M 2003/076; H02M 2003/077; G05F 1/563
See application file for complete search history.

(56) References Cited

U.S. PATENT DOCUMENTS 9,136,756 B2 *    9/2015    Liu .................. H02M 3/07
9,281,743 B1 *    3/2016    Oner ................ H02M 3/073
(Continued)

OTHER PUBLICATIONS

Co-pending U.S. Appl. No. 16/387,335, filed Apr. 17, 2019, Transient Response Optimization for Charge-Pump-Based Two-Stage Power Converter, by by Mark Mercer, 36 pages.

*Primary Examiner* — Thienvu V Tran
*Assistant Examiner* — Shahzeb K Ahmad
(74) *Attorney, Agent, or Firm* — Saile Ackerman LLC; Stephen B. Ackerman (57) ABSTRACT

Circuits and methods to enable wireless power transmission and reception are presented. A two-stage power converter has a boost regulator to boost an input voltage to an intermediate voltage. Moreover, the two-stage power converter may also comprise a charge pump coupled to the boost regulator to generate an output voltage based on the intermediated voltage. More particularly, the charge pump may comprise a plurality of transistor devices and a flying capacitor and the charge pump may be bypassed during a bypass mode of operation. Finally, the two-stage power converter may have control circuitry coupled to the charge pump. In particular, the control circuitry may generate a control voltage of a first transistor device of the plurality of transistor devices in order to regulate a discharge rate of the flying capacitor, during a transition phase from the bypass mode of operation to a normal mode of operation.

25 Claims, 5 Drawing Sheets

(56) References Cited

U.S. PATENT DOCUMENTS

| | | | |
|---|---|---|---|
| 2009/0102439 A1* | 4/2009 | Williams | H02M 3/07 |
| | | | 323/266 |
| 2014/0268946 A1* | 9/2014 | Liu | H02M 3/1582 |
| | | | 363/60 |
| 2016/0239040 A1* | 8/2016 | Ripley | H04B 1/40 |
| 2017/0250607 A1* | 8/2017 | Zhak | H02M 1/32 |
| 2018/0115246 A1* | 4/2018 | Azrai | H02M 3/1582 |
| 2018/0234011 A1* | 8/2018 | Muramatsu | H02M 3/073 |
| 2019/0058385 A1* | 2/2019 | Lazaro | H02M 1/08 |
| 2019/0260306 A1* | 8/2019 | Ma | H02M 3/158 |
| 2019/0348913 A1* | 11/2019 | Zhang | H02M 1/36 |

* cited by examiner

CHARGE PUMP TRANSIENT RESPONSE OPTIMIZATION BY CONTROLLED FLYING CAPACITOR DISCHARGE DURING BYPASS TO SWITCHING MODE TRANSITION

TECHNICAL FIELD

This disclosure relates to power converters. In particular, the present document relates to a two-stage converter in which one stage is a charge pump and a remaining stage is a DC-DC switching power converter.

BACKGROUND

Recently, wireless charging modes have been developed for the charging of portable devices (e.g., mobile devices) in which the portable device typically includes a coil for receiving or transmitting power wirelessly from or to a coil in an external device. However, due to the less-than-ideal coupling between such coils, the portable device may generally require a relatively high-power supply voltage such as 15 V to energize its coil when transmitting power to another device. But on the other hand, the battery voltage of a portable device is typically a substantially lower voltage such as 4 V. A portable device thus may need a power converter to boost the battery voltage to the elevated power supply voltage necessary for the wireless power transmission/reception.

One choice for such power conversion may be a two-stage power converter in which a boost converter boosts the battery voltage to an intermediate voltage that is then multiplied (e.g., doubled) by a flying-capacitor-based charge pump. The resulting two-stage power converter has advantageous efficiency and regulation. However, during certain modes of operation such as startup and shutdown, the charge pump is not switched but instead has its input shorted to its output such that the charge pump is bypassed. During the bypass mode of operation, it is only the boost converter that is driving the output voltage for the two-stage converter. There would thus be a first transition phase from the bypass mode to a normal mode of operation in which charge pump is actively switching. Similarly, there would also be a second transition phase from the normal mode of operation to the bypass mode of operation. In both transition phases, the output voltage may exhibit significant overshoot and undershoot of the desired regulated value.

Further, when the charge pump is initially configured in pass-through or bypass mode prior to the start of the switching phase (normal mode), the flying capacitor of the charge pump is pre-charged. Once the charge pump begins switching, the output voltage will change in a significant and abrupt manner. Such an abrupt change in the output voltage can be detrimental to the circuitry that is connected to the output.

SUMMARY

In view of some or all of the above problems, the present disclosure proposes circuitry for a two-stage power converter and methods for operating such two-stage power converter, having the features of the respective independent claims.

An aspect of the disclosure relates to a two-stage power converter. The two-stage power converter may be implemented in a portable device (e.g., a mobile device, a wireless charger, etc.), as will be appreciated by the skilled person. In particular, the two-stage power converter may comprise, as a first stage, a boost regulator configured to boost an input voltage to an intermediate voltage (typically larger than the input voltage). The boost regulator may be inductor-based boost regulator or may be implemented in any other suitable manner. By way of example, the input voltage may be provided by a battery (or a DC rail) such as 4 V, and the intermediate voltage generated by the boost regulator may be 5 V. Moreover, the two-stage power converter may also comprise, as a second stage, a charge pump coupled to the boost regulator and configured to generate an output voltage (e.g., 10 V) based on the intermediated voltage. Of course, the sequence of first and second stages and be switched if necessary. As will be understood and appreciated by the skilled person, various designs can be adopted for implementing the charge pump, which in general, may comprise a plurality of (e.g., four) transistor devices (switching devices) and a flying capacitor. In this case, the charge pump may also be referred to as a flying-capacitor-based charge pump. As is well known in the art (of charge pump), the charge pump can be implemented either in a non-interleaved configuration (with only one side/branch of serially coupled transistor devices/switching devices) or an interleaved configuration (with two sides/branches of serially coupled transistor devices/switching devices, wherein the two sides/branches operate in a complimentary manner). In particular, as will be understood and appreciated by the skilled person, during a normal mode (i.e., a switching mode) of operation of the charge pump, the plurality of transistor devices (switching devices) are alternatingly put in an ON state (i.e., a conducting state) and an OFF state (i.e., a non-conducting state). By way of example, some of (e.g., half) the plurality of transistor devices are in the ON state during a first switching phase of the normal mode of operation and are in the OFF state during a second switching phase of the normal mode of operation; while the other of (e.g., the other half) the plurality of transistor devices are operated in a complementary manner, i.e., are in the OFF state during a first switching phase and are in the ON state during a second switching phase. On the other hand, during the bypass mode of operation, the charge pump is not switched but instead has its input shorted to its output (i.e., bypassed). Consequently, during the bypass mode of operation, it is only the boost converter that is driving the output voltage for the two-stage power converter. During the bypass mode of the operation, the voltage across the flying capacitor may at the same time be charged to the intermediate voltage. Of course, it should be noted that other suitable circuitry such as a multiplier circuitry or a switch capacitor step-up converter (instead of a charge pump) may be used for generating the output voltage based on the intermediate voltage. Finally, the two-stage power converter may also comprise a control circuitry (e.g., a drive control circuitry) coupled to the charge pump. In particular, the control circuitry may be configured to generate a control voltage of a first transistor device of the plurality of transistor devices in order to regulate a discharge rate of the flying capacitor, during a transition phase from the bypass mode of operation to the normal mode of operation. By way of example, if the first transistor device is a MOSFET device, the control circuitry may be configured to generate a gate (control) voltage that is applied to the gate terminal of the MOSFET device.

Configured as proposed, particularly by controlling/adjusting the control voltage of the transistor device, the discharge rate of the flying capacitor can be regulated in such a manner that the under/overshoot of the output voltage (e.g., when the charge pump transitions from a bypass or static state to a switching state) can be minimized. Notably, by utilizing a controlled discharge of the flying capacitor as such, the energy stored (i.e., charged) in the flying capacitor(s) during the bypass mode is not wasted (e.g., having to be completely discharged before being recharged again) during the transition phase.

In some embodiments, the control voltage may be generated based on a voltage across the flying capacitor and a variable reference voltage. As will be understood and appreciated by the skilled person, the variable reference voltage may be provided (e.g., generated) by an independently controlled voltage source. In particular, in some examples, the provision/generation of the variable reference voltage may be controlled in such a manner that is in accordance with a desired discharging rate of the flying capacitor, in order to minimize (avoid) the undershoot or overshoot scenarios as illustrated above.

In some embodiments, the control circuitry may comprise a voltage sensing circuit configured to sense a voltage across the flying capacitor. Upon sensing the voltage across the flying capacitor, the sensing circuit may also be configured to generate (output) an amplified voltage that is proportional (or equal) to the sensed voltage in any suitable manner. By way of example, the output amplified voltage may be a scaled version (e.g., $\frac{1}{5}$) of the sensed voltage across the flying capacitor.

In some embodiments, the control circuitry may further comprise an amplifier circuit configured to generate an error voltage. In particular, the error voltage may be generated based on a difference between the amplified voltage (that is generated by the sense circuit) and a variable reference voltage. As illustrated above, the variable reference voltage may be provided (e.g., generated) by an independently controlled voltage source. In particular, in some examples, the variable reference voltage (or to be more precise, the provision/generation of the variable reference voltage) may be controlled in accordance with a desired discharging rate of the flying capacitor, in order to minimize (avoid) the under/overshoot scenarios.

In some embodiments, the control circuitry may further comprise a buffer circuit configured to generate a first intermediate supply voltage. In particular, the first intermediate supply voltage may be generated to be equal to or to be a scaled value of the error voltage that is generated by the amplifier circuit.

In some embodiments, the control circuitry may further comprise an active clamp circuit supplied by the output voltage, alternatively to the buffer circuit. In particular, the active clamp circuit may be configured to generate a second intermediate supply voltage based on the error voltage that is generated by the amplifier circuit (e.g., an error amplifier).

In some embodiments, the control circuitry may further comprise, in addition to the buffer circuit, a gate driver circuit. In particular, the gate driver circuit may be configured to generate the control voltage of the first transistor device. More particularly, the gate driver circuit may be supplied, in a suitable manner, by the first intermediate supply voltage that is generated by the buffer circuit.

In some embodiments, the control circuitry may further comprise a first capacitive element (e.g., a capacitor) and a refresh switching device (e.g., a refresh transistor device such as a MOSFET). In particular, the refresh switching device may be configured to selectively couple the first capacitive element to the buffer circuit, e.g., in order to charge the first capacitive element using the first intermediate voltage that is generated by the buffer circuit. More particularly, during a first switching phase of the normal mode (i.e., switching mode) of operation of the charge pump (e.g., the first switching phase as illustrated above), the refresh switching device may be put in the ON state and the first capacitive element can be charged by the first intermediate supply voltage. On the other hand, during a second switching phase in the normal mode of operation of the charge pump (e.g., the second switching phase as illustrated above), the refresh switching device may be put in the OFF state and the first capacitive element may be coupled between a gate terminal and a source terminal of the first transistor device. Notably, in such cases, the first capacitive element may sometimes also be referred to as an external capacitive element (i.e., that is external to the other circuits such as the buffer circuit, the gate driver circuit, etc.) and may for example have a capacitance in a range of 10-100 nF depending on different circumstances and implementations.

In some embodiments, the buffer circuit may comprise a low-dropout (LDO) regulator. As will be appreciated by the skilled person, the LDO regular can be implemented in various suitable manners, such as using an amplifier and a pass device (e.g., a MOSFET).

In some embodiments, the control circuitry may further comprise, in addition to the active clamp circuit, a gate driver circuit. In particular, the gate driver circuit may be configured to generate the control voltage of the first transistor device. More particularly, the gate driver circuit is supplied by the second intermediate supply voltage that is generated by the active clamp circuit.

In some embodiments, the active clamp circuit may comprise an active clamp switching device (e.g., an active clamp transistor device such as a MOSFET). In particular, the active clamp switching device may be configured to selectively couple the flying capacitor in parallel with a second capacitive element. Notably, in such cases, the second capacitive element may sometimes also be referred to as an internal capacitive element (e.g., an internal or parasitic capacitor of some circuit element/component) and may typically have a (substantially) smaller capacitance compared to that of the first capacitive element (i.e., the external capacitive element) as illustrated above. As will be understood any appreciated by the skilled person, such internal capacitive element may even be omitted in some situations/configurations, e.g., in the sense that it can be replaced by a parasitic capacitor of a switching device.

In some embodiments, the active clamp circuit may further comprise a first comparator and a second comparator. In particular, the first comparator may be configured to generate a first signal based on the error voltage that is generated by the amplifier circuit and a voltage across the second capacitive element (i.e., the internal capacitive element). On the other hand, the second comparator may be configured to generate a second signal based on the voltage across the second capacitive element and a predetermined voltage level. In some cases, this predetermined voltage level may be a maximum allowable voltage level that can be used for controlling (e.g., protecting) the voltage across the second capacitive element from being exposed to voltage levels that may cause excessive stress and possible damage. Correspondingly, the active clamp switching device may be controlled by a voltage that is generated based on the first signal and the second signal.

In some embodiments, the control voltage of the first transistor device may be controlled (generated) such that the first transistor device can operate in a saturation mode (e.g., as opposed to the normal active mode or triode mode) during the transition phase. As will be understood and appreciated by the skilled person, the transistor device may generally behave as a voltage controlled current source in such saturation mode.

In some embodiments, particularly during the normal mode of operation, the output voltage may be generated to be a multiple of (e.g., twice) the intermediate voltage generated by the boost regulator. On the other hand, during the bypass mode of operation, the output voltage may be equal to the intermediate voltage generated by the boost regulator, since the charge pump is bypassed as illustrated above. During the bypass mode of the operation, the voltage across the flying capacitor may at the same time be charged to the intermediate voltage.

In some embodiments, the output voltage may be generated to equal twice the intermediate voltage. And correspondingly, during the transition phase, the voltage across the flying capacitor may be discharged to a value that is half the output voltage.

In some embodiments, the boost regulator may be configured to receive the output voltage as feedback. As will be appreciated by the skilled person, such feedback may be accomplished by a feedback loop circuit or any other suitable manners. The boost regulator may be further configured to adjust the intermediate voltage accordingly based on the output voltage and a desired voltage level for the output voltage. In other words, the boost regulator may be configured to adjust the intermediate voltage in accordance with the output voltage, such that a desired output voltage level can be reached eventually.

In some embodiments, a time constant of a control loop of the boost regulator may be shorter than a time constant of the discharge rate of the flying capacitor. That is to say, the boost regulator should be controlled in such a manner that the speed (or the bandwidth) of the boost regulator (in particular, the control loop of the boost regulator) can be faster than the (desired) discharge rate of the flying capacitor. In some cases, this requirement may be fulfilled by controlling the variable reference voltage (e.g., controlling the slope of the variable reference voltage) such that the variable reference voltage changes at a rate slower than the response time of the control loop of the boost regulator.

Another aspect of the disclosure relates to a method for operating a two-stage power converter. The two-stage power converter may be implemented in accordance with the above illustration. In particular, the two-stage power converter may comprise a boost regulator and a charge pump coupled together. As will be understood and appreciated by the skilled person, various designs can be adopted for implementing the charge pump, which in general, may comprise a plurality of (e.g., four) transistor devices (switching devices) and a flying capacitor. In this case, the charge pump may also be referred to as a flying-capacitor-based charge pump. As is well known in the art (of charge pump), the charge pump can be implemented either in a non-interleaved configuration (with only one side/branch of serially coupled transistor devices/switching devices) or an interleaved configuration (with two sides/branches of serially coupled transistor devices/switching devices, wherein the two sides/branches operate in a complimentary manner). As will be understood and appreciated by the skilled person, during a normal mode (i.e., switching mode) of operation of the charge pump, the plurality of transistor devices (switching devices) will be alternatingly put in an ON state (i.e., a conducting state) and an OFF state (i.e., a non-conducting state). By way of example, some (e.g., half) of the plurality of transistor devices are in the ON state during a first switching phase of the normal mode of operation and are in the OFF state during a second switching phase of the normal mode of operation; while the other (e.g., the other half) of the plurality of transistor devices are operated in a complementary manner, i.e., are in the OFF state during a first switching phase and are in the ON state during a second switching phase. On the other hand, during the bypass mode of operation, the charge pump is not switched but instead has its input shorted to its output (i.e., bypassed). Of course, it should be noted that other suitable circuitry such as a multiplier circuitry or a switch capacitor step-up converter, instead of a charge pump, may be used for generating the output voltage based on the intermediate voltage. Finally, the two-stage power converter may further comprise a control circuitry (e.g., a drive control circuitry) coupled to the charge pump. Arranged as such, the method may comprise boosting, by the boost regulator, an input voltage to an intermediate voltage. By way of example, the input voltage may be provided by a battery (or a DC rail) such as 4 V, and the intermediate voltage generated by the boost regulator may be 5 V. The method may also comprise generating, by the charge pump, an output voltage (e.g., 10 V) based on the intermediate voltage. The method may further comprise generating, using the control circuitry, a control voltage of a first transistor device of the plurality of transistor devices in order to regulate a discharge rate of the flying capacitor, during a transition phase from the bypass mode of operation to the normal mode of operation. By way of example, if the first transistor device is a MOSFET device, the control circuitry may be configured to generate a gate (control) voltage that is applied to the gate terminal of the MOSFET device.

Configured as proposed, particularly by controlling/adjusting the control voltage of the transistor device, the discharge rate of the flying capacitor can be regulated in such a manner that the under/overshoot of the output voltage (i.e., when the charge pump transitions from a bypass or static state to a switching state) can be minimized. Notably, by utilizing a controlled discharge of the flying capacitor as such, the energy stored (i.e., charged) in the flying capacitor (s) during the bypass mode is not wasted (e.g., having to be completely discharged before being recharged again) during the transition phase.

In some embodiments, the control voltage may be generated based on a voltage across the flying capacitor and a variable reference voltage. As will be understood and appreciated by the skilled person, the variable reference voltage may be provided (e.g., generated) by an independently controlled voltage source. In particular, in some examples, the provision/generation of the variable reference voltage may be controlled in such a manner that is in accordance with a desired discharging rate of the flying capacitor, in order to minimize (avoid) the undershoot or overshoot scenarios as illustrated above.

In some embodiments, the method may further comprise controlling the control voltage of the first transistor device such that the first transistor device operates in a saturation mode (as opposed to the normal active mode) and behaves like a voltage controlled current source during the transition phase.

In some embodiments, the method may further comprise generating the output voltage to be twice the intermediate voltage that is generated by the boost regulator, during the normal mode of operation. On the other hand, the method may further comprise discharging the flying capacitor such that a voltage across the flying capacitor is half the output voltage, during the transition phase.

In some embodiments, the method may further comprise monitoring the output voltage and adjusting the intermediate voltage based on the output voltage and a desired voltage level for the output voltage. As will be appreciated by the skilled person, such monitoring may be achieved via the help of a feedback loop circuit or any other suitable manner. Arranged as such, the boost regulator may be configured to adjust the intermediate voltage in accordance with the output voltage, such that a desired output voltage level can be reached eventually.

In some embodiments, the method may further comprise controlling the boost regulator, such that a time constant of a control loop of the boost regulator is shorter than a time constant of the discharge rate of the flying capacitor. That is to say, the boost regulator should be controlled in such a manner that the speed (or the bandwidth) of the boost regulator (in particular, the control loop of the boost regulator) can be faster than the (desired) discharge rate of the flying capacitor. In some cases, this requirement may be fulfilled by controlling the variable reference voltage (e.g., controlling the slope of the variable reference voltage) such that the variable reference voltage changes at a rate slower than the response time of the control loop of the boost regulator.

The details of the disclosed method can be implemented as an apparatus adapted to execute some or all or the steps of the method, and vice versa, as will be appreciated by the skilled person. In particular, it is understood that methods according to the disclosure relate to methods of operating the circuits according to the above embodiments and variations thereof, and that respective statements made with regard to the circuits likewise apply to the corresponding methods.

It is also understood that in the present document, the term "couple" or "coupled" refers to elements being in electrical communication with each other, whether directly connected e.g., via wires, or in some other manner (e.g., indirectly). Notably, one example of being coupled is being connected.

Other and further embodiments of the present disclosure will become apparent during the course of the following discussion and by reference to the accompanying drawings.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of a two-stage power converter according to an embodiment of the present disclosure.

DESCRIPTION

As indicated above, identical or like reference numbers in the disclosure indicate identical or like elements, and repeated description thereof may be omitted for reasons of conciseness. Any switching devices mentioned in this disclosure may be transistor devices (and vice versa), such as MOSFETs.

Figure 1:
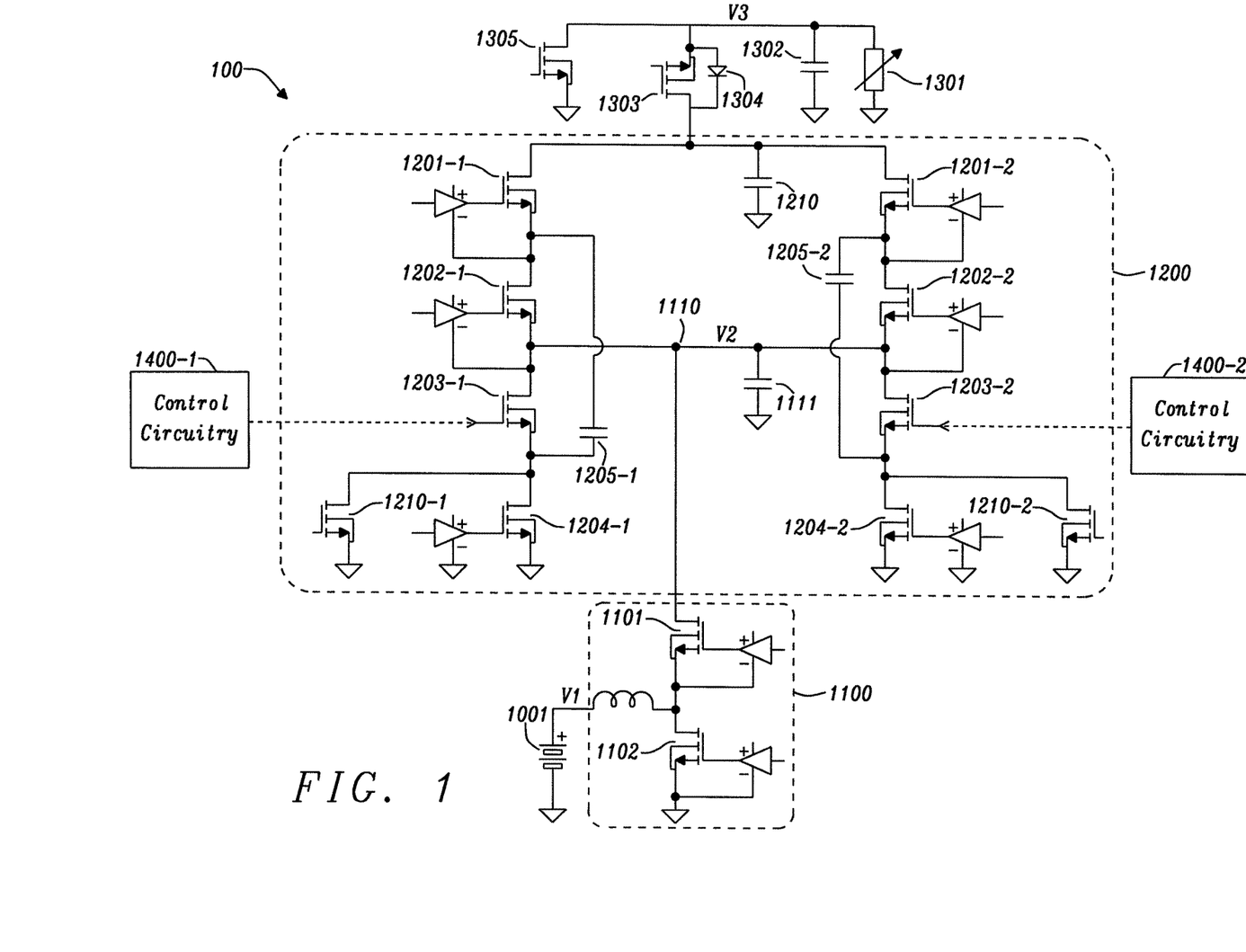

FIG. 1 schematically illustrates an example of a two-stage power converter 100 according to an embodiment of the present disclosure. The two-stage power converter 100 may also be considered as a two-stage step-up converter/regulator. Generally speaking, the two-stage power converter 100 is configured to generate an output voltage V3 based on an input voltage V1. In the example of FIG. 1, the input voltage V1 is provided (e.g., generated) by a battery 1001, and may be at a (relatively) low voltage level (e.g., 4 V). In particular, the two-stage power converter 100 comprises a boost regulator (e.g., a two-level boost regulator/converter) 1100. In the example as shown in FIG. 1, the boost regulator 1100 comprises a high side switching device (e.g., a high side MOSFET) 1101 and a low side switching device (e.g., a low side MOSFET) 1102. Arranged as such, the boost regulator 1100 can be configured to boost the input voltage V1 into an intermediate voltage V2 (e.g., 5V) at an intermediate node 1110. As will be appreciated by the skilled person, a switching capacitive element (e.g., a switching capacitor) 1111 may also be provided at the intermediate node 1110.

Figure 2:
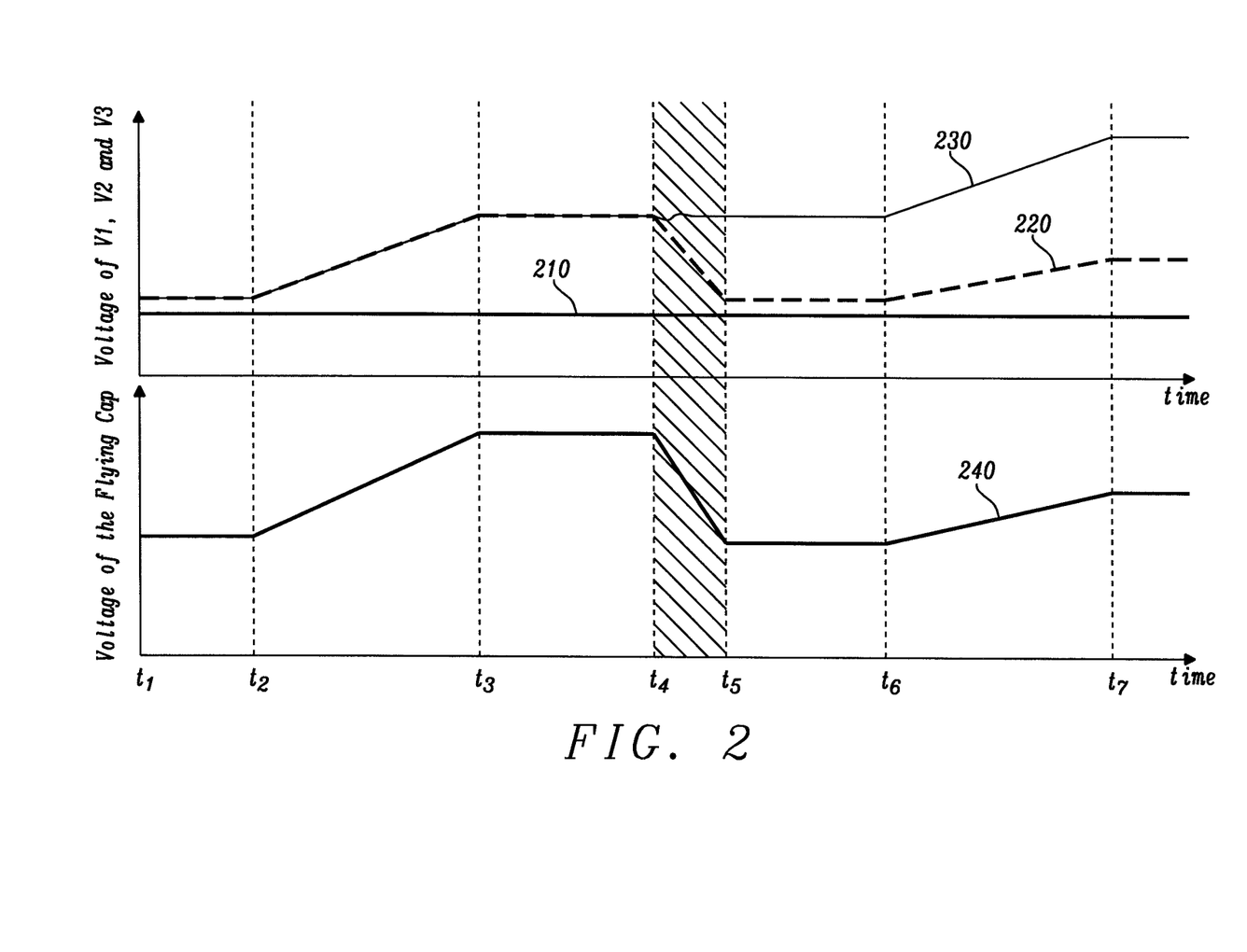
FIG. 2 schematically illustrates an example of a waveform diagram of a sequence of operations of the two-stage power converter according to an embodiment of the present disclosure.

The two-stage power converter 100 further comprises a charge pump circuit 1200. As is well known in the art (of charge pump), the charge pump can be implemented either in a non-interleaved configuration (with only one side/branch of serially coupled transistor devices/switching devices) or an interleaved configuration (with two sides/branches of serially coupled transistor devices/switching devices, wherein the two sides/branches operate in a complimentary manner). In the example as shown in FIG. 2, the charge pump 1200 is an interleaved (power) charge pump and comprises a left branch consisting of four switching devices (e.g. four MOSFETs) 1201-1-1204-1 and a right branch consisting of another four switching devices (e.g., another four MOSFETs) 1201-2-1204-2. However, as will be clearly understood and appreciated by the skilled person, the charge pump 1200 can of course comprise other number of switching devices (i.e., different from the four switching devices in each branch as shown in FIG. 1), depending on various circumstances and/or requirements. Furthermore, two flying capacitors 1205-1, 1205-2 are coupled to the left and right branches of the charge pump 1200, respectively. Notably, during a bypass mode of operation when the charge pump 1200 is bypassed (e.g., when the switching devices 1201 and 1202 are put in the ON state), it is only the boost converter 1100 that is driving the output voltage V3 for the two-stage power converter 100. At the same time, the flying capacitors 1205-1, 1205-2 may also be charged to the intermediate voltage V2. In such cases, the voltage across the flying capacitors 1205-1, 1205-2, the intermediate voltage V2 and the output voltage V3 may essentially have the same voltage level during the bypass mode of the charge pump 1200. As will be clearly understood and appreciated by the skilled person, the charge pump 1200 may optionally further comprise a respective (relatively) small switching device 1210-1, 1210-2 in each branch of the charge pump

1200, in order to soft charge the respective flying capacitor 1205-1, 1025-2 at the beginning of the bypass mode.

In the example of FIG. 1, for providing/generating the output voltage V3, the two-stage power converter 100 comprises an output stage which includes a load 1301 and an output capacitor 1302. Optionally, the output stage may further comprise a (relatively) small switching device 1305 for discharging the output voltage V3 and a reverse current protection circuit consisting of a switching device 1303 and a diode 1304. Of course, other possible implementations of the output stage can be readily appreciated and adopted by the skilled person, in order to generate the (desired) output voltage V3.

Notably, while the rest of the switching devices, i.e., the switching devices 1201, 1202 and 1204 of the charge pump 1200 are controlled in a regular (normal) manner, the switching devices 1203-1 and 1203-2 are specifically controlled via a respective control circuitry 1400-1, 1400-2 which will be discussed in detailed later. In particular, the control circuitry 1400-1, 1400-2 is configured to generate a control voltage (e.g., a gate voltage) of the switching device 1203-1, 1203-2 of the charge pump 1200, in order to regulate a discharge rate of the flying capacitor 1205-1, 1205-2, particularly during a transition phase from the bypass mode of operation to the normal mode of operation.

Configured as proposed, particularly by controlling/adjusting the control voltage of the switching device 1203-1, 1203-2, the discharge rate of the flying capacitor 1205-1, 1205-2 can be regulated in such a manner that the under/overshoot of the output voltage V3 (i.e., when the charge pump 1200 transitions from a bypass or static state to a switching state) can be minimized. Notably, by utilizing a controlled discharge of the flying capacitor 1205-1, 1205-2 as such, the energy stored (i.e., charged) in the flying capacitor 1205-1, 1205-2 during the bypass mode is not wasted (e.g., having to be completely discharged before being recharged again) during the transition phase.

Notably, although not shown in FIG. 1, it should be well understood and appreciated by the skilled person that the two-stage power converter 100 may further comprise a feedback loop that feeds the output voltage V3 (or an indication thereof) back to the boost regulator 1100. Accordingly, the boost regulator 100 may then be further configured to adjust the intermediate voltage V2 based on (the feedback of) the output voltage V3 and a desired voltage level for the output voltage. That is to say, the boost regulator 1100 may be configured to adjust the intermediate voltage in accordance with the output voltage (or the feedback), in order to generate an output voltage that matches a desired output voltage level.

FIG. 2 schematically illustrates an example of a waveform diagram of a sequence of operations of the two-stage power converter according to an embodiment of the present disclosure. In particular, the example of the waveform diagram schematically illustrates the changes over time of the voltage level of the input voltage V1, the intermediate voltage V2, the output voltage V3 and the voltage across the flying capacitor 1205 of the two-stage power converter 100 as shown in FIG. 1, with particular focus on the transition from the bypass mode to the switching mode (normal mode) of the charge pump 1200. More particularly, as shown in FIG. 2, waveform 210 corresponds to the input voltage V1, waveform 220 corresponds to the intermediate voltage V2, waveform 230 corresponds to the output voltage V3, and waveform 240 corresponds to the voltage across the flying capacitor (e.g., the flying capacitor 1205 of FIG. 1) of the charge pump of the two-stage power converter (e.g., the charge pump 1200 of the two-stage power converter 100 of FIG. 1).

In particular, as can be seen from waveform 210 of FIG. 2, the input voltage V1 (e.g., provided by the battery 1101 of FIG. 1) remains at a constant voltage level (e.g., 4 V) over time.

Now, in a first time interval from $t_1$ to $t_2$, the two-stage power converter operates in a steady-state bypass mode. As can be seen from FIG. 2, during this first time interval, the intermediate voltage V2 and the output voltage V3 are maintained at a same first programmed/predetermined voltage level (e.g., 5 V). Similarly, during this first time interval, the voltage across the flying capacitor is also charged and maintained at the same first programmed/predetermined voltage level (e.g., 5 V) as the intermediate voltage V2 and the output voltage V3, since the charge pump is bypassed. Notably, the start-up sequence (i.e., the sequence of operation before the charge pump enters the bypass mode) is considered to be completed prior to the first time interval and thus is not shown in FIG. 2.

In a second time interval from $t_2$ to $t_3$, a possible power negotiation (e.g., a power negotiation between a wireless charger client, i.e., RX and a wireless charger host, i.e., TX) may take place and cause the intermediate voltage V2 and the output voltage V3 to increase to a second steady-state voltage level (e.g., 10V). Correspondingly, the voltage across the flying capacitor is also charged and follows the same voltage level (e.g., 10 V) as the intermediate voltage V2 and the output voltage V3, since the charge pump is still bypassed.

In a third time interval from $t_3$ to $t_4$, the boost regulator (e.g., the inductor based two-level boost regulator 1100 of FIG. 1) maintains the outputted intermediate voltage level V2 at the second steady-state voltage level (e.g., 10V). Correspondingly, the output voltage V3, as well as the voltage across the flying capacitor, will also be maintained at the second steady-state level, since the charge pump is still in the bypass mode.

Summarizing, in the example as shown in FIG. 2, the charge pump remains in the bypass mode during the whole time period from $t_1$ to $t_4$ (i.e., the first to third time intervals), thus the intermediate voltage V2, the output voltage V3 and the voltage across the flying capacitor (as shown in waveforms 220, 230 and 240 respectively) exhibit the same voltage level and changes over time. Notably, with reference to the charge pump 1200 of the two-stage power converter 100 of FIG. 1, all switches devices will be in the ON state (i.e., the conducting state) except the switching devices 1203-1, 1203-2 that are controlled by the control circuitry 1400-1, 1400-2, during the bypass mode of operation. At the same time, the small discharging switching device 1305 would also be in the OFF state, and the high side switching device 1101 and the low side switching device 1102 of the boost regular 1100 of FIG. 1 would be alternatingly put to the ON state are needed to regulate (generate) the output voltage V3.

Starting from the time instance $t_4$, the charge pump begins transitioning from the bypass mode of operation to the normal mode of operation (i.e., the switching mode of operation). As will be understood and appreciated by the skilled person, the switching devices of the charge pump begin switching in the normal complimentary manner. For example, with reference to the two-stage power converter 100 of FIG. 1, particularly with respect to the left side/branch of the interleaved charge pump 1200, the switching devices 1201-1 and 1203-1 are in the ON state during a first switching phase (e.g., the first half of a full/complete switching period) and the switching devices 1202-1 and 1204-1 are in the ON state during a second switching phase (e.g., the second half of a full/complete switching period). Correspondingly, the switching devices 1201-2-1204-2 in the right side/branch of the charge pump 1200 operate in a complimentary manner, compared to those in the left side/branch.

Notably, during a four time interval from $t_4$ to $t_5$, the control voltages (e.g., gate voltages) of switching devices 1203-1 and 1203-2 are particularly controlled in such a manner such that the switching devices 1203-1 and 1203-2 operate in saturation (as opposed to the regular active mode). Consequently, the switching devices 1203-1 and 1203-2 behave like voltage controlled current sources when they are not turned (completely) off. Notably, this behavior of situation mode/operation can limit the discharge rate of the flying capacitors 1205-1 and 1205-2, in order to prevent an abrupt transient step disturbance on the output voltage V3.

In the example of FIG. 2, the fourth time interval will be considered to be completed once the flying capacitors are discharged down to half the output voltage V3 (e.g., 5 V). In response to the change in the voltage across the flying capacitor(s), the boost regulator will try to modulate/regulate the intermediate voltage V2 and to maintain the output voltage V3 at the target/desired value (e.g., 10 V). That is also to say, the boost regulator will always regulate the intermediate voltage V2 to match the voltage across the flying capacitor(s). A detailed description of the mechanism for controlling the discharge rate of the flying capacitors will be described later. Configured as proposed, in particular by utilizing a controlled discharge of the flying capacitor(s) as such, the energy stored (i.e., during the charging of the flying capacitor) in the flying capacitor(s) during the bypass mode is not wasted (e.g., having to be completely discharged before being recharged again) during the transition phase.

Next, during a fifth time interval from $t_5$ to $t_6$, both the boost regulator and charge pump operate with a normal switching pattern. Consequently, the output voltage V3 is maintained at the second programmed level (e.g., 10 V).

Subsequently, a further possible power negotiation (e.g., a further power negotiation between the wireless charger client and the wireless charger host) may occur and cause the output voltage V3 to ramp up to a third programmed level (e.g., 15 V). Correspondingly, the intermediate voltage V2 and the voltage across the flying capacitor(s) may then track proportionately, as illustrated above. The changes in the voltage levels are shown as a sixth time interval from $t_6$ to $t_7$ and a seventh time interval from $t_7$ onwards in the respective waveforms.

Summarizing, the charge pump operates in the switching mode during the whole time period from $t_4$ to $t_7$ and onwards. In particular, in the example as shown in FIG. 2, the flying capacitor is gradually discharged from the same voltage level of the output voltage V3 (e.g., 10 V) down to half the voltage level of the output voltage V3 (e.g., 5 V) in a controlled manner in accordance with a desired discharge rate of the flying capacitor, during the fourth time interval (i.e., from $t_4$ to $t_5$). Therefore, in some cases, the fourth time interval (i.e., from $t_4$ to $t_5$) may also be referred to as the "soft" switching phase (of the switching mode of operation), or simply the transition phase. Correspondingly, the fifth up to the seventh time interval (i.e., from $t_4$ to $t_7$) may be then be referred to as the "hard" (or regular) switching phase (of the switching mode of operation). Configured as proposed, in particular by utilizing a controlled discharge of the flying capacitor(s) as such, the energy stored (i.e., during the charging of the flying capacitor) in the flying capacitor(s) during the bypass mode is not wasted (e.g., having to be completely discharged before being recharged again) during the transition phase (i.e., the fourth time interval).

Notably with reference to FIG. 1, at the beginning of the transition phase, the charge pump begins switching already. Since the flying capacitors were connected in parallel with the switching capacitor 1111 prior to fourth time interval, the flying capacitors are charged to the output voltage V3. Consequently, it would be detrimental for the charge pump to immediately begin "hard" switching operation because the output would very likely overshoot significantly due to the charge stored on the flying capacitors. Therefore, it is necessary to control the discharge rate (in some cases, even on a cycle-by-cycle basis) of the flying capacitors, such that the output voltage V3 is properly maintained at the desired level. For this to be accomplished, the speed of the boost regulator's control loop (i.e., the bandwidth) must be faster than the discharge rate of the flying capacitor. In other words, a time constant of the control loop of the boost regulator should be shorter than a time constant of the discharge rate of the flying capacitor. As the flying capacitor discharges, the boost regulator needs to be able to adjust the voltage level of the intermediate voltage V2 to track the (change of) the voltage level across the flying capacitor. Once the voltage across the flying capacitor is discharged to e.g., half the output voltage V3 in the example of FIGS. 1 and 2, the charge pump can end the "soft" switching phase of operation and begin the "hard" switching phase of operation. As will be understood and appreciated by the skilled person, the "hard" switching phase of operation helps to (or in some cases is even necessary for) achieving minimum power loss.

Figure 3:
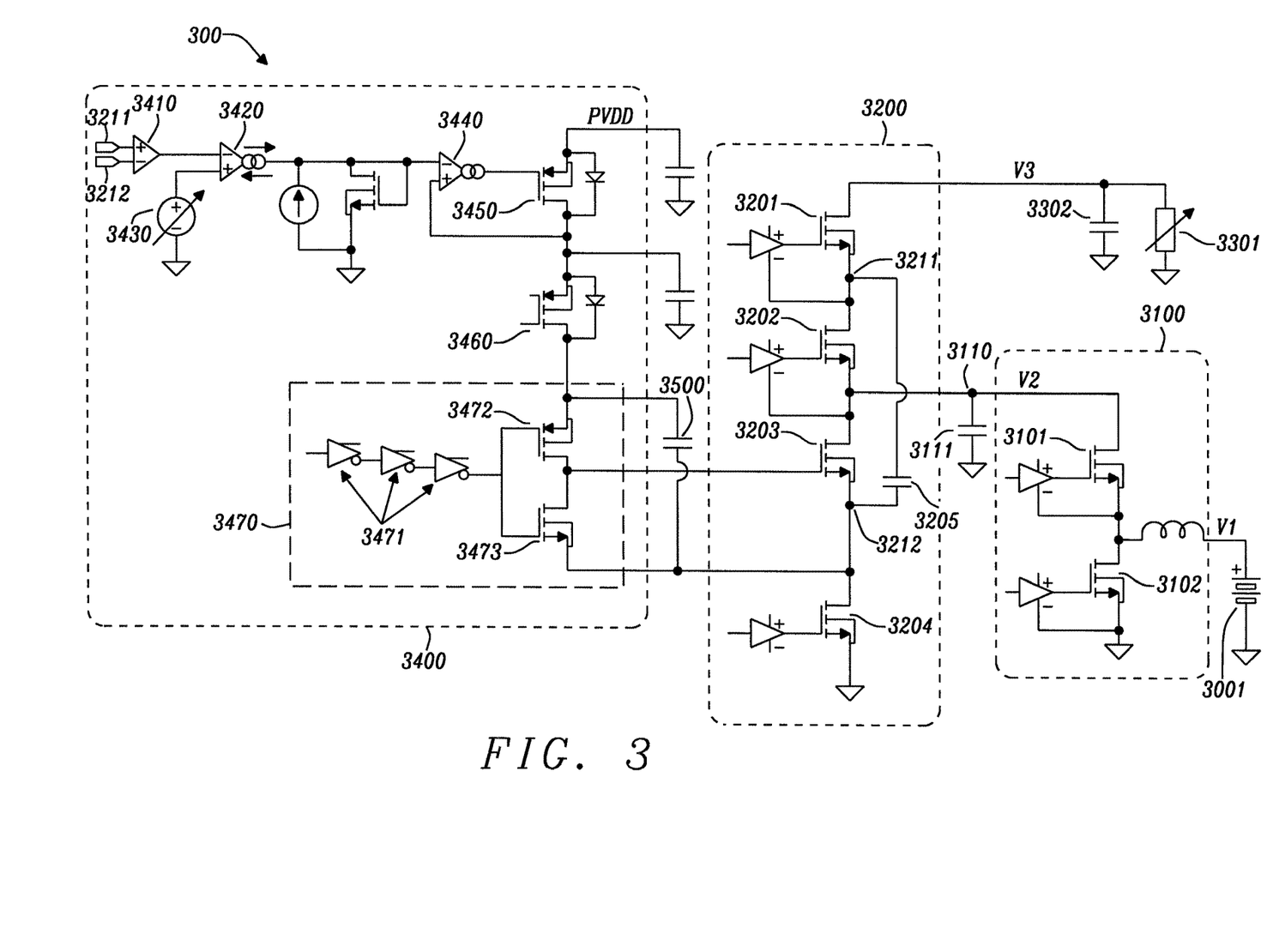
FIG. 3 schematically illustrates another example of a two-stage power converter according to an embodiment of the present disclosure.

FIG. 3 schematically illustrates an example of a two-stage power converter 300 according to an embodiment of the present disclosure. In particular, identical or like reference numbers in FIG. 3 indicate identical or like elements in the two-stage power converter 100 as shown in FIG. 1, such that repeated description thereof may be omitted for reasons of conciseness.

Notably, in the example of FIG. 3, the charge pump is arranged in a non-interleaved configuration (i.e., with only one side/branch), as opposed to the interleaved configuration as shown in the example of FIG. 1.

Generally speaking, in the example of FIG. 3, it is proposed that the soft-switching phase of the flying capacitor 3205 is to be accomplished by controlling the current flowing in the switching device 3203 during the bypass mode of the charge pump 3200 where the flying capacitor 3205 is (directly) coupled to the output voltage V3. As will be understood and appreciated by the skilled person, the current in the switching device 3203 will be dictated by the respective terminal voltages. For example, if the intermediate voltage V2 is larger than a difference between the gate voltage ($V_{G\_3203}$) of the switching device 3203 and the turn-on threshold voltage $V_{th\_3203}$ of the switching device 3203 (i.e., $V2 > V_{G\_3203} - V_{th\_3203}$), then the switching device 3203 is biased in the saturation mode and behaves like a voltage controlled current source.

The gate-source voltage of the switching device 3203, which can be calculated based on the difference between the gate voltage of the switching device 3203 and the source voltage of the switching device 3203, is either 0 V or $V_{3500} - V_{S\_3203}$ (wherein $V_{3500}$ is the voltage across the external capacitor 3500; and $V_{S\_3203}$ is the voltage at the source node/terminal 3212 of the switching device 3203), depending on the state of a first control logic signal (not shown in FIG. 3) that is applied to the input (port or terminal) of the gate driver circuit 3470 of the control circuitry 3400. In the example as shown in FIG. 3, the gate driver circuit 3470 comprises a plurality of (three) inverters 3471, a high side switching device 3472 and a low side switching device 3473. However, any other suitable implementations of the gate driver circuit 3400 may be adopted, as will be appreciated by the skilled person.

When the first control logic signal is set to high (i.e., logic "1"), the current in the switching device 3203 is dictated by $V_{3500}-V_{S\_3203}$. Consequently, the gate driver circuit 3470 is able to control the value of $V_{3500}-V_{S\_3203}$ in a manner that is necessary to limit the discharge rate of the flying capacitor 3205 as illustrated above.

Furthermore, the control circuitry 3400 also comprises a difference amplifier 3410 (which may, together with some other circuit components if necessary, act as a sensing circuit). In particular, the voltage level at the node 3211 (i.e., one terminal of the flying capacitor 3205) is applied to the non-inverting terminal (positive terminal) of the difference amplifier 3410 and the voltage level at the node 3212 (i.e., the other terminal of the flying capacitor 3205) is applied to the inverting terminal (negative terminal) of the difference amplifier 3410. Configured as such, the difference amplifier 3410 may sense the voltage across the flying capacitor 3205. Depending on the implementation of the difference amplifier 3410, the output of the difference amplifier 3410 may be equal to or a scaled version (e.g., ⅕) of the voltage of the flying capacitor 3205.

The output voltage of the difference amplifier 3410 is then compared, by an error amplifier 3420 (which may, together with some other circuit components if necessary, act as an amplifier circuit), to a variable reference voltage generated by an independent voltage source 3430. Consequently, the error amplifier 3420 generates an output signal (voltage) that may, depending on different implementations and/or requirements, be proportional (or equal) to the difference between the output voltage of the difference amplifier 3410 and the variable reference voltage.

The output voltage of the error amplifier 3420 is then buffered by a buffer circuit comprising an amplifier 3440 and a pass device 3450. The buffer circuit may, in some cases, act like a LDO regulator and regulate the respective output (e.g., may be referred to as a first intermediate supply voltage) to be equal to the output voltage of the error amplifier 3420. Alternatively, utilizing different implementations of the buffer circuit, the output (the first intermediate supply voltage) of the buffer circuit could be generated as a scaled value of the output voltage of the error amplifier 3420, as will be appreciated by the skilled person. As will be understood and appreciated by the skilled person, the buffer circuit may be supplied by an independent and predetermined voltage PVDD (e.g., 4 V). Such independent and predetermined voltage PVDD may be generated by a separated LDO regulator and/or may remain constant (fixed) during operation.

The control circuitry may further comprise another switching device (e.g., a PMOS switching device) 3460 coupled between the buffer circuit and the gate driver circuit 3470. In particular, the switching device 3460 is controlled by a second control logic signal (or by an inversed version of the second control logic signal depending on circumstances, not shown in FIG. 3). Notably, the second control logic signal is also applied to control the switching device 3204 of the charge pump 3200. More particularly, in the example of FIG. 3, when the second control logic signal goes high (i.e., logic "1"), the switching device 3460 will be turned on, and additionally, the switching device 3204 will also be turned on. This causes the voltage generated by the buffer circuit (i.e., the first intermediate supply voltage) to be imposed across an external capacitor 3500. Subsequently, during the next half of the switching cycle of the charge pump 3200, the second control logic signal will go low (i.e., being set to logic "0") and the first control logical signal will go high (i.e., being set to logic "1"). Consequently, the external capacitor 3500 is then connected (coupled) between the gate-source terminals of the switching device 3203.

As will be clearly understood and appreciated by the skilled person, these interactions (i.e., the interactions among the switching devices, the circuits and control logic signals as illustrated above) form a closed-loop regulation of the voltage across the flying capacitor 3205 and the respective discharge rate thereof. Accordingly, during the soft-switching interval (i.e., the transition phase), the closed-loop regulation of the flying capacitor 3205 actively operates and causes the discharge rate of the flying capacitor 3205 to be proportional to the variable reference voltage generated by the independent voltage source 3430. In particular, the voltage level of the variable reference voltage can be independently controlled in such a manner that the voltage level changes at a rate that is slower than the response time of the control loop of the boost regulator 3100, thereby satisfying the above illustrated requirements.

Generally speaking, in some cases, it may be desirable to eliminate the external capacitor(s) (e.g., the external capacitor 3500 as shown in FIG. 3), for example in order to reduce the BOM (bill of materials) and PCB footprint of the overall circuitry and system. The external capacitor typically, for instance in the example of FIG. 3, serves as the supply for the (floating) gate driver circuit 3470. Consequently, when the external capacitor is to be eliminated, the supply of the gate driver circuit 3470 must be generated or controlled by a regulator inside the circuitry itself. Notably, the transient requirements of a gate drivers may exceed the capability of a conventional internal regulator due to bandwidth limitations. Therefore, it has been proposed to utilize the flying capacitor of the charge pump as the energy source for the floating gate driver circuit. However, it is generally not feasibly or possible to couple both terminals of the flying capacitor directly to the supply terminals of the gate driver circuit. This is typically due to the fact that the voltage of the flying capacitor may exceed the gate-source breakdown rating of the power switching device. Therefore, there is desired to have a mechanism to limit the voltage that is applied to the gate driver circuit. Moreover, it may also be required, in some cases, that the limiting mechanism may be able to respond rapidly in order to supply the necessary charge to the gate of the power switching device, in order to turn the switching device on quickly and minimize power loss.

Figure 4:
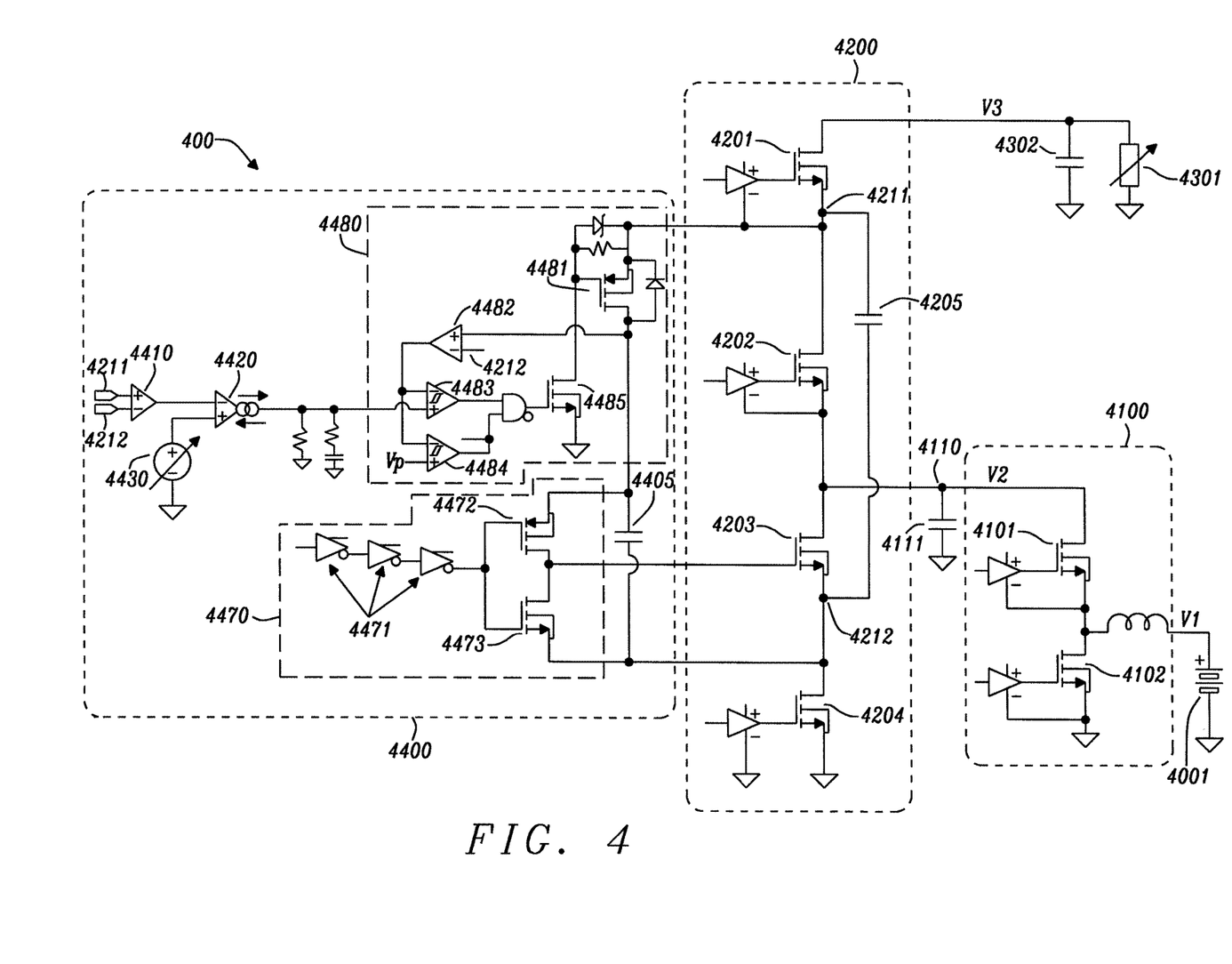
FIG. 4 schematically illustrates yet another example of a two-stage power converter according to an embodiment of the present disclosure.

FIG. 4 schematically illustrates yet another example of a two-stage power converter 400 according to an embodiment of the present disclosure, particularly in view of some or all of the above considerations. In particular, identical or like reference numbers in FIG. 4 indicate identical or like elements in the two-stage power converter 300 as shown in FIG. 3, such that repeated description thereof may be omitted for reasons of conciseness. Notably, in the example of FIG. 4, the charge pump is also arranged in a non-interleaved configuration, similar to that of FIG. 3.

Generally speaking, the implementation of the control circuitry 4400 of the two-stage power converter 400 as shown in FIG. 4 comprises several circuits and/or components that are (essentially) the same as those shown in FIG.

3, such as the difference amplifier 4410 (the sensing circuit), the error amplifier 4420 (the amplifier circuit) including the variable reference voltage generated by the independent voltage source 4430, and the gate driver circuit 4470. On the other hand, the buffer circuit of FIG. 3 is replaced by an active clamp circuit 4480. Moreover, as shown in FIG. 4, the external capacitor 3500 in FIG. 3 has been removed and is replaced with an internal capacitive element 4405. Notably, the internal capacitive element 4405 may for example be an internal or parasitic capacitor of some circuit element/component and may typically have a (substantially) smaller capacitance compared to that of the external capacitive element 3500 (a typical capacitance value of such external capacitive element may be in a range of 10-100 nF) as illustrated above. As will be understood any appreciated by the skilled person, such internal capacitive element 4405 may even be omitted in some situations/configurations, e.g., in the sense that it can be replaced by a parasitic capacitor of a switching device.

In particular, the active clamp circuit 4480 is controlled by a first comparator 4483 and a second comparator 4484 comprised therein. The first comparator 4483 is configured to monitor the difference between the voltage across the internal capacitive element 4405 and the output voltage of the error amplifier 4420. When the output voltage of the error amplifier 4420 exceeds the voltage across the internal capacitive element 4405, the first comparator 4483 would assert a logic "high" signal (e.g., a logic "1"). At the same time, the (positive) terminal (i.e., connected to the node 4211) of the flying capacitor 4205, will be coupled to the internal capacitive element 4405 via the active clamp switching device (e.g., a PMOS switching device) 4481. On the other hand, the output of the first comparator 4483 would go low (e.g., asserting a logic "0") when the output voltage of the error amplifier 4420 falls below the voltage across the internal capacitive element 4405. Consequently, this causes the switching device 4485 and the active clamp switching device 4481 to sequentially turn off.

Once the variable reference voltage exceeds the output of the sensing circuit 4410, the output of the amplifier circuit 4420 will always exceed the output of a second difference amplifier 4482. Therefore, the output of the first comparator 4483 will always be set as "high". In this case, the second comparator 4484 would assert a logic "low" whenever the voltage across the internal capacitive element 4405 equals or exceeds a maximum allowable voltage level $V_P$ that is provided at the positive input (terminal) of the second comparator 4484. As will be understood and appreciated by the skilled person, the maximum allowable voltage level $V_P$ should be understood as a maximum voltage that can be used for controlling (e.g., protecting) the voltage across the second capacitive element from being exposed to voltage levels that may cause excessive stress and possible damage. In other words, in response to (the output signals of) the first and second comparators 4483 and 4484, the active clamp circuit 4480 can maintain the appropriate supply voltage for the gate driver circuit 4470 for the switching device 4203 at a suitable level that causes the output of the sensing circuit 4410 to track the variable reference voltage until the voltage across the flying capacitor 4205 to be discharged to equal half the output voltage V3, as illustrated above.

Figure 5:
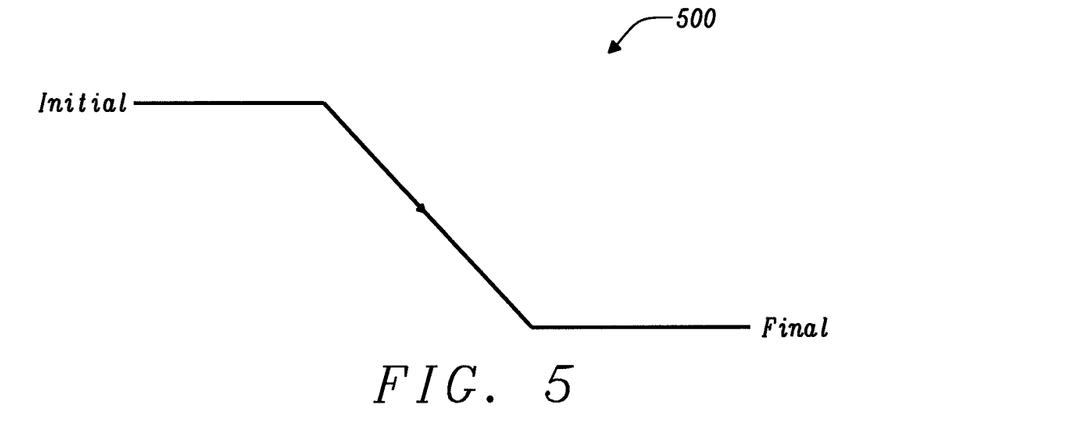
FIG. 5 schematically illustrates an example of a variable reference voltage according to an embodiment of the present disclosure.

FIG. 5 schematically illustrates an example of a diagram 500 showing the change of a variable reference voltage according to an embodiment of the present disclosure. The variable reference voltage may for example be the variable reference voltage generated by the independently controlled voltage source 3430 in FIG. 3 or 4430 in FIG. 4.

Notably, the diagram 500 should be understood as merely an (simplified) example for controlling the voltage level of the variable referenced voltage, and any other suitable implementations for such control can be adopted, depending on circumstances and/or requirements. As described above, in order to successfully control the discharge rate of the flying capacitor, it may generally mean that the boost regulator should be controlled in such a manner that the speed (or bandwidth) of the boost regulator (in particular, the control loop of the boost regulator) is faster than the (desired) discharge rate of the flying capacitor. With reference to the example as shown in FIG. 5, this requirement may be satisfied by controlling the slope of the variable reference voltage between the initial voltage level and the final voltage level (e.g., 0 V), such that it changes at a rate slower than the response time of the control loop of the boost regulator.

Figure 6:
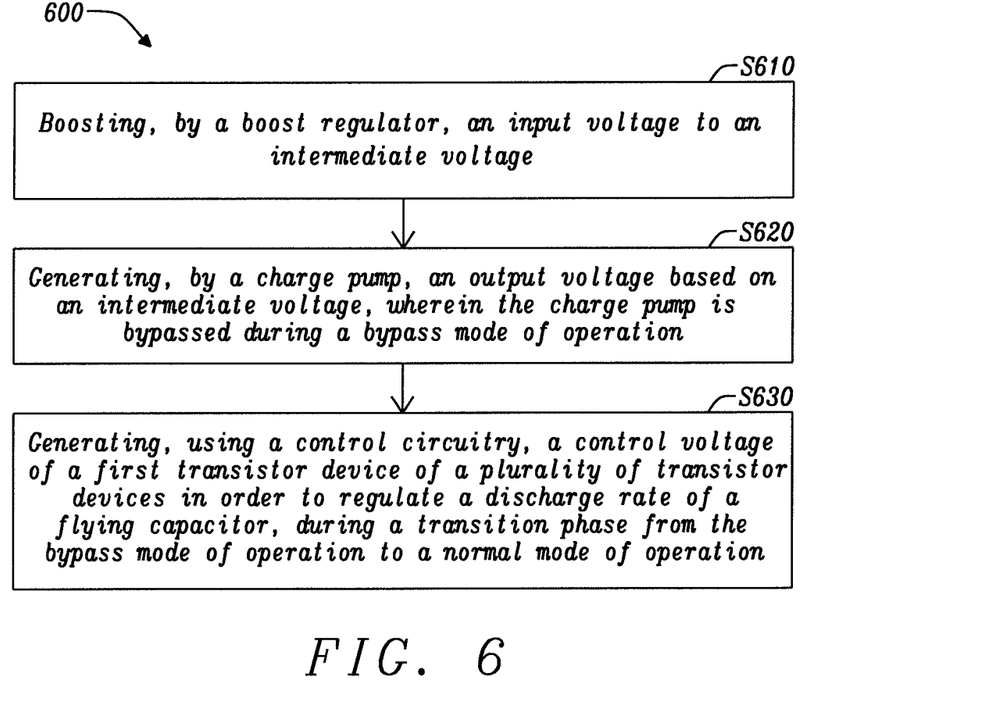
FIG. 6 schematically illustrates, in flowchart form, a method for operating a two-stage power converter according to an embodiment of the present disclosure.

FIG. 6 schematically illustrates, in flowchart form, a method 600 for operating a two-stage power converter according to an embodiment of the present disclosure. The two-stage power converter may correspond to any one of the two-stage power converter 100, 300 and 400 as shown in FIGS. 1, 3 and 4, respectively. Therefore, repeated description for the two-stage power converter thereof may be omitted for reasons of conciseness. In particular, the method 600 comprises, at step S610, boosting, by a boost regulator (e.g., the boost regular 1100 of FIG. 1), an input voltage (e.g., the input voltage V1 of FIG. 1) to an intermediate voltage (e.g., the intermediate voltage V2 of FIG. 1). The method 600 further comprises, at step S620, generating, by a charge pump (e.g., the charge pump 1200 of FIG. 1), an output voltage (e.g., the output voltage V3 of FIG. 1) based on the intermediate voltage. In particular, the charge pump is bypassed during a bypass mode of operation. The method 600 yet further comprises, at step S630, generating, using a control circuitry (e.g., the control circuitry 1400 of FIG. 1), a control voltage (e.g., a gate voltage) of a first transistor device (e.g., the switching device 1203 of FIG. 1) of a plurality of transistor devices of the charge pump, in order to regulate a discharge rate of a flying capacitor of the charge pump, during a transition phase from the bypass mode of operation to a normal mode of operation.

It should be noted that the apparatus (circuitry) features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of theses circuits.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A two-stage power converter, comprising:
 a boost regulator configured to boost an input voltage to an intermediate voltage;
 a charge pump coupled to the boost regulator, wherein the charge pump comprises a plurality of transistor devices and a flying capacitor, wherein the charge pump is configured to generate an output voltage based on the intermediate voltage, and wherein the charge pump can be bypassed during a bypass mode of operation; and
 a control circuitry coupled to the charge pump,
 wherein the control circuitry is configured to generate a control voltage of a first transistor device of the plurality of transistor devices in order to regulate a discharge rate of the flying capacitor, during a transition phase from the bypass mode of operation to a normal mode of operation; and
 wherein the control voltage of the first transistor device is controlled such that the first transistor device operates in a saturation mode and behaves like a voltage controlled current source during the transition phase.

2. The two-stage power converter according to claim 1, wherein the control voltage is generated based on a voltage across the flying capacitor and a variable reference voltage.

3. The two-stage power converter according to claim 1, wherein the control circuitry comprises:
 a voltage sensing circuit configured to sense a voltage across the flying capacitor and to generate an amplified voltage that is proportional to the sensed voltage.

4. The two-stage power converter according to claim 3, wherein the control circuitry further comprises:
 an amplifier circuit configured to generate an error voltage based on a difference between the amplified voltage and a variable reference voltage.

5. The two-stage power converter according to claim 4, wherein the variable reference voltage is controlled in accordance with a desired discharging rate of the flying capacitor.

6. The two-stage power converter according to claim 1,
 wherein, during the normal mode of operation, the output voltage is generated to be a multiple of the intermediate voltage generated by the boost regulator; and
 wherein, during the bypass mode of operation, the output voltage is equal to the intermediate voltage generated by the boost regulator.

7. The two-stage power converter according to claim 6,
 wherein the output voltage equals twice the intermediate voltage during the normal mode of operation; and
 wherein the voltage across the flying capacitor is discharged to a value that is half the output voltage during the transition phase.

8. The two-stage power converter according to claim 1, wherein the boost regulator is configured to receive the output voltage as feedback and to adjust the intermediate voltage based on the output voltage and a desired voltage level for the output voltage.

9. The two-stage power converter according to claim 1, wherein a time constant of a control loop of the boost regulator is shorter than a time constant of the discharge rate of the flying capacitor.

10. A two-stage power converter, comprising:
 a boost regulator configured to boost an input voltage to an intermediate voltage;
 a charge pump coupled to the boost regulator, wherein the charge pump comprises a plurality of transistor devices and a flying capacitor, wherein the charge pump is configured to generate an output voltage based on the intermediate voltage, and wherein the charge pump can be bypassed during a bypass mode of operation; and
 a control circuitry coupled to the charge pump,
 wherein the control circuitry is configured to generate a control voltage of a first transistor device of the plurality of transistor devices in order to regulate a discharge rate of the flying capacitor, during a transition phase from the bypass mode of operation to a normal mode of operation; and
 wherein the control circuitry comprises:
 a voltage sensing circuit configured to sense a voltage across the flying capacitor and to generate are amplified voltage that is proportional to the sensed voltage;
 an amplifier circuit configured to generate an error voltage based on a difference between the amplified voltage and a variable reference voltage; and
 a buffer circuit configured to generate a first intermediate supply voltage, wherein the first intermediate supply voltage is generated to be equal to or to be a scaled value of the error voltage.

11. The two-stage power converter according to claim 10, wherein the control circuitry further comprises:
 a gate driver circuit configured to generate the control voltage of the first transistor device, wherein the gate driver circuit is supplied by the first intermediate supply voltage.

12. The two-stage power converter according to claim 11, wherein the control circuitry further comprises:
 a first capacitive element; and
 a refresh switching device for selectively coupling the first capacitive element to the buffer circuit,
 wherein, during a first switching phase of the charge pump, the refresh switching device is in an ON state and the first capacitive element is charged by the first intermediate supply voltage; and
 wherein, during a second switching phase of the charge pump, the refresh switching device is in an OFF state and the first capacitive element is coupled between a gate terminal and a source terminal of the first transistor device.

13. The two-stage power converter according to claim 10, wherein the buffer circuit comprises:
 a low-dropout (LDO) regulator including an amplifier and a pass device.

14. A two-stage power converter, comprising:
 a boost regulator configured to boost an input voltage to an intermediate voltage;
 a charge pump coupled to the boost regulator, wherein the charge pump comprises a plurality of transistor devices and a flying capacitor, wherein the charge pump is configured to generate an output voltage based on the intermediate voltage, and wherein the charge pump can be bypassed during a bypass mode of operation; and
 a control circuitry coupled to the charge pump,
 wherein the control circuity is configured to generate a control voltage of a first transistor device of the plurality of transistor devices in order to regulate a discharge rate of the flying capacitor, during a transition phase from the bypass mode of operation to a normal mode of operation; and
 wherein the control circuitry comprises:
 a voltage sensing circuit configured to sense a voltage across the flying capacitor and to generate an amplified voltage that is proportional to the sensed voltage;
 an amplifier circuit configured to generate an error voltage based on a difference between the amplified voltage and a variable reference voltage; and an active clamp circuit supplied by the output voltage, wherein the active clamp circuit is configured to generate a second intermediate supply voltage based on the error voltage.

15. The two-stage power converter according to claim 14, wherein the control circuitry further comprises:
a gate driver circuit configured to generate the control voltage of the first transistor device, wherein the gate driver circuit is supplied by the second intermediate supply voltage.

16. The two-stage power converter according to claim 14, wherein the active clamp circuit comprises:
an active clamp switching device, wherein the active clamp switching device is configured to selectively couple the flying capacitor in parallel with a second capacitive element.

17. The two-stage power converter according to claim 16, wherein the active clamp further comprises:
a first comparator configured to generate a first signal based on the error voltage and a voltage across the second capacitive element; and
a second comparator configured to generate a second signal based on the voltage across the second capacitive element and a predetermined voltage level,
wherein the active clamp switching device is controlled by a voltage generated based on the first signal and the second signal.

18. A method for operating a two-stage power converter, wherein two-stage power converter comprises:
a boost regulator;
a charge pump coupled to the boost regulator, wherein the charge pump comprises a plurality of transistor devices and a flying capacitor; and
a control circuitry coupled to the charge pump, and wherein the method comprises:
boosting, by the boost regulator, an input voltage to an intermediate voltage;
generating, by the charge pump, an output voltage based on the intermediate voltage, wherein the charge pump is bypassed during a bypass mode of operation; and
generating, using the control circuitry, a control voltage of a first transistor device of the plurality of transistor devices in order to regulate a discharge rate of the flying capacitor, during a transition phase from the bypass mode of operation to a normal mode of operation; and
wherein the method further comprises:
controlling the control voltage of the first transistor device such that the first transistor device operates in a saturation mode and behaves like a voltage controlled current source during the transition phase.

19. The method according to claim 18, wherein the control voltage is generated based on a voltage across the flying capacitor and a variable reference voltage.

20. The method according to claim 19, wherein the method further comprises:
controlling the variable reference voltage in accordance with a desired discharging rate of the flying capacitor.

21. The method according to claim 18, wherein the method further comprises:
during the normal mode of operation, generating the output voltage to be twice the intermediate voltage generated by the boost regulator; and
during the transition phase, discharging the flying capacitor such that a voltage across the flying capacitor is half the output voltage.

22. The method according to claim 18, wherein the method further comprises:
monitoring the output voltage; and
adjusting the intermediate voltage based on the output voltage and a desired voltage level for the output voltage.

23. The method according to claim 18, wherein the method further comprises:
controlling the boost regulator, such that a time constant of a control loop of the boost regulator is shorter than a time constant of the discharge rate of the flying capacitor.

24. A method for operating a two-stage power converter, wherein two-stage power converter comprises:
a boost regulator;
a charge pump coupled to the boost regulator, wherein the charge pump comprises a plurality of transistor devices and a flying capacitor; and
a control circuitry coupled to the charge pump, and wherein the method comprises:
boosting, by the boost regulator, an input voltage to an intermediate voltage;
generating, by the charge pump, an output voltage based on the intermediate voltage, wherein the charge pump is bypassed during a bypass mode of operation; and
generating, using the control circuitry, a control voltage of a first transistor device of the plurality of transistor devices in order to regulate a discharge rate of the flying capacitor, during a transition phase from the bypass mode of operation to a normal mode of operation; and
wherein the control circuitry comprises:
a voltage sensing circuit configured to sense a voltage across the flying capacitor and to generate an amplified voltage that is proportional to the sensed voltage;
an amplifier circuit configured to generate an error voltage based on a difference between the amplified voltage and a variable reference voltage; and
a buffer circuit configured to generate a first intermediate supply voltage, wherein the first intermediate supply voltage is generated to be equal to or to be a scaled value of the error voltage.

25. A method for operating a two-stage power converter, wherein two-stage power converter comprises:
a boost regulator;
a charge pump coupled to the boost regulator, wherein the charge pump comprises a plurality of transistor devices and a flying capacitor; and
a control circuitry coupled to the charge pump, and wherein the method comprises:
boosting, by the boost regulator, an input voltage to an intermediate voltage;
generating, by the charge pump, an output voltage based on the intermediate voltage, wherein the charge pump is bypassed during a bypass mode of operation; and
generating, using the control circuitry, a control voltage of a first transistor device of the plurality of transistor devices in order to regulate a discharge rate of the flying capacitor, during a transition phase from the bypass mode of operation to a normal mode of operation; and
wherein the control circuitry comprises:
a voltage sensing circuit configured to sense a voltage across the flying capacitor and to generate an amplified voltage that is proportional to the sensed voltage;

an amplifier circuit configured to generate an error voltage based on a difference between the amplified voltage and a variable reference voltage; and an active clamp circuit supplied by the output voltage, wherein the active clamp circuit is configured to generate a second intermediate supply voltage based on the error voltage.

* * * * *